United States Patent
Chen et al.

(10) Patent No.: US 11,194,625 B2
(45) Date of Patent: Dec. 7, 2021

(54) SYSTEMS AND METHODS FOR ACCELERATING DATA OPERATIONS BY UTILIZING NATIVE MEMORY MANAGEMENT

(71) Applicant: BigStream Solutions, Inc., Mountain View, CA (US)

(72) Inventors: Weiwei Chen, Mountain View, CA (US); Behnam Robatmili, San Jose, CA (US); Maysam Lavasani, Los Altos, CA (US); John David Davis, San Francisco, CA (US)

(73) Assignee: BIGSTREAM SOLUTIONS, INC., Mountain View, CA (US)

( * ) Notice: Subject to any disclaimer, the term of this patent is extended or adjusted under 35 U.S.C. 154(b) by 184 days.

(21) Appl. No.: 16/702,278

(22) Filed: Dec. 3, 2019

(65) Prior Publication Data

US 2020/0183749 A1 Jun. 11, 2020

Related U.S. Application Data

(60) Provisional application No. 62/775,533, filed on Dec. 5, 2018.

(51) Int. Cl.
| | |
|---|---|
| *G06F 9/44* | (2018.01) |
| *G06F 9/50* | (2006.01) |
| *G06F 8/30* | (2018.01) |
| *G06F 9/4401* | (2018.01) |
| *G06F 12/02* | (2006.01) |
| *G06F 9/445* | (2018.01) |
| *G06F 8/51* | (2018.01) |

(52) U.S. Cl.
CPC .......... *G06F 9/5016* (2013.01); *G06F 8/31* (2013.01); *G06F 8/51* (2013.01); *G06F 9/4403* (2013.01); *G06F 9/44521* (2013.01); *G06F 9/44557* (2013.01); *G06F 9/5022* (2013.01); *G06F 9/5027* (2013.01); *G06F 12/023* (2013.01)

(58) Field of Classification Search
CPC ....................................................... G06F 9/44
See application file for complete search history.

(56) References Cited

U.S. PATENT DOCUMENTS

| | | | |
|---|---|---|---|
| 10,803,413 B1 * | 10/2020 | Xu | .................. G06Q 10/06316 |
| 2013/0138703 A1 * | 5/2013 | Daynes | ............... G06F 9/44521 |
| | | | 707/813 |
| 2017/0262868 A1 * | 9/2017 | Manjunath | ............ G06F 16/907 |
| 2019/0050213 A1 * | 2/2019 | Schanafelt | ................ G06F 8/31 |

* cited by examiner

*Primary Examiner* — Jae U Jeon
(74) *Attorney, Agent, or Firm* — Jaffery Watson Mendonsa & Hamilton LLP

(57) ABSTRACT

For one embodiment of the present invention, methods and systems for accelerating data operations with efficient memory management in native code and native dynamic class loading mechanisms are disclosed. In one embodiment, a data processing system comprises memory and a processing unit coupled to the memory. The processing unit is configured to receive input data, to execute a domain specific language (DSL) for a DSL operation with a native implementation, to translate a user defined function (UDF) into the native implementation by translating user defined managed software code into native software code, to execute the native software code in the native implementation, and to utilize a native memory management mechanism for the memory to manage object instances in the native implementation.

21 Claims, 9 Drawing Sheets

SYSTEMS AND METHODS FOR ACCELERATING DATA OPERATIONS BY UTILIZING NATIVE MEMORY MANAGEMENT

RELATED APPLICATIONS

This application claims the benefit of U.S. Provisional Application No. 62/775,533, filed on Dec. 5, 2018, the entire contents of this Provisional application is hereby incorporated by reference.

TECHNICAL FIELD

Embodiments described herein generally relate to the field of data processing, and more particularly relates to native memory management for accelerating big data operations.

BACKGROUND

Conventionally, big data is a term for data sets that are so large or complex that traditional data processing applications are not sufficient. Challenges of large data sets include analysis, capture, data curation, search, sharing, storage, transfer, visualization, querying, updating, and information privacy.

Main-stream big data platforms as well as user-level applications are typically written in managed languages such as Scala, Java, Python due to their sophisticated programmability and rich library collections. Managed languages use garbage-collection based memory management and run on virtual machines with their own object layout, which lead to non-negligible runtime overhead when dealing with large amount of data.

Off-heap memory can be used to bypass garbage-collection management. However, this requires design with object serialization and deserialization support. While big data systems can have such support internally, it is generally not easy to implement in user-defined code. Consequently, performance for applications with extensive user-defined functions can still suffer from memory management overhead.

SUMMARY

For one embodiment of the present invention, methods and systems for accelerating big data operations with efficient memory management in native code and native dynamic class loading mechanism are disclosed. In one embodiment, a data processing system comprises memory and a processing unit coupled to the memory. The processing unit is configured to receive input data, to execute a domain specific language (DSL) for a DSL operation with a native implementation, to translate a user defined function (UDF) into the native implementation by translating user defined managed software code into native software code, to execute the native software code in the native implementation, and to utilize a native memory management mechanism for the memory to manage object instances in the native implementation.

Other features and advantages of embodiments of the present invention will be apparent from the accompanying drawings and from the detailed description that follows below.

DETAILED DESCRIPTION OF EMBODIMENTS

Figure 1:
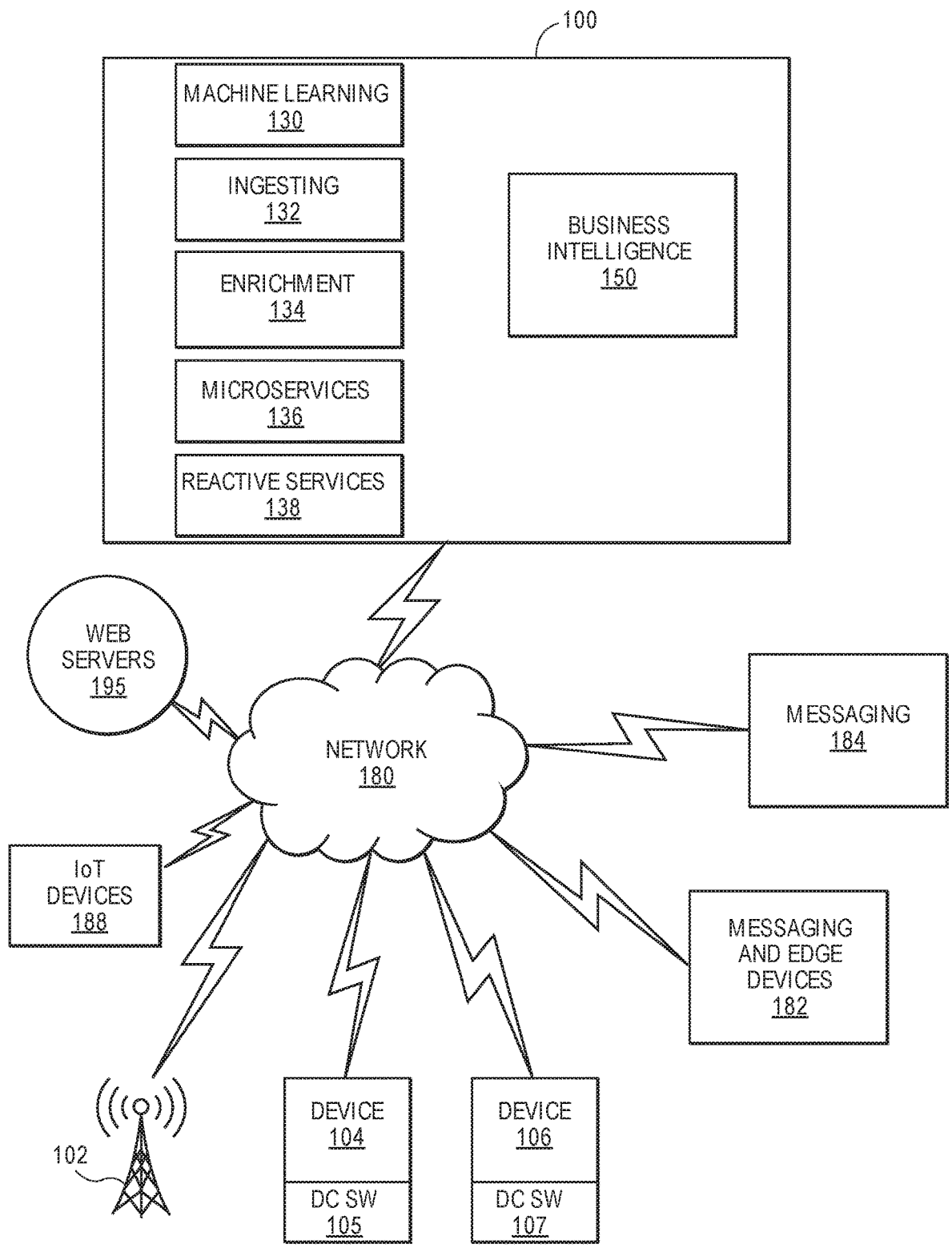
FIG. 1 shows an embodiment of a block diagram of a big data system 100 for providing big data applications for a plurality of devices in accordance with one embodiment.

Methods, systems and apparatuses for accelerating big data operations with memory management are described. Big data applications have grown tremendously in recent years to address high volume and high variety of data in a cost-effective and innovative way for achieving enhanced business insights, decision making, risk management, process automation, etc. In-memory processing allows quick data accesses which enables real-time analysis for faster reporting and decision-making. It is also usually computationally intensive due to replacing storing intermediate processing results on disk storages with recomputing to keep data in memory. Efficient memory management and high computational power are essential elements to enable ultra-low latency in-memory big data systems. Embodiments of this invention provide a design with a native runtime system for big data acceleration with lightweight memory management and fast computation. The present design is integrated in a seamless automated way with main-stream big data platforms and completely autonomy for the users.

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily all referring to the same embodiment.

The following glossary of terminology and acronyms serves to assist the reader by providing a simplified quick-reference definition. A person of ordinary skill in the art may understand the terms as used herein according to general usage and definitions that appear in widely available standards and reference books.

HW: Hardware.
SW: Software.
I/O: Input/Output.
DMA: Direct Memory Access.
CPU: Central Processing Unit.
FPGA: Field Programmable Gate Arrays.
CGRA: Coarse-Grain Reconfigurable Accelerators.
GPGPU: General-Purpose Graphical Processing Units.
MLWC: Many Light-weight Cores.
ASIC: Application Specific Integrated Circuit.
PCIe: Peripheral Component Interconnect express.
CDFG: Control and Data-Flow Graph.
FIFO: First In, First Out
NIC: Network Interface Card
HLS: High-Level Synthesis
KPN: Kahn Processing Networks (KPN) is a distributed model of computation (MoC) in which a group of deterministic sequential processes are communicating through unbounded FIFO channels. The process network exhibits deterministic behavior that does not depend on various computation or communication delays. A KPN can be mapped onto any accelerator (e.g., FPGA based platform) for embodiments described herein.

Dataflow analysis: An analysis performed by a compiler on the CDFG of the program to determine dependencies between a write operation on a variable and the consequent operations which might be dependent on the written operation.

Accelerator: a specialized HW/SW component that is customized to run an application or a class of applications efficiently.

In-line accelerator: An accelerator for I/O-intensive applications that can send and receive data without CPU involvement. If an in-line accelerator cannot finish the processing of an input data, it passes the data to the CPU for further processing.

Bailout: The process of transitioning the computation associated with an input from an in-line accelerator to a general purpose instruction-based processor (i.e. general purpose core).

Continuation: A kind of bailout that causes the CPU to continue the execution of an input data on an accelerator right after the bailout point.

Rollback: A kind of bailout that causes the CPU to restart the execution of an input data on an accelerator from the beginning or some other known location with related recovery data like a checkpoint.

Gorilla++: A programming model and language with both dataflow and shared-memory constructs as well as a toolset that generates HW/SW from a Gorilla++ description.

GDF: Gorilla dataflow (the execution model of Gorilla++).

GDF node: A building block of a GDF design that receives an input, may apply a computation kernel on the input, and generates corresponding outputs. A GDF design consists of multiple GDF nodes. A GDF node may be realized as a hardware module or a software thread or a hybrid component. Multiple nodes may be realized on the same virtualized hardware module or on a same virtualized software thread.

Engine: A special kind of component such as GDF that contains computation.

Infrastructure component: Memory, synchronization, and communication components.

Computation kernel: The computation that is applied to all input data elements in an engine.

Data state: A set of memory elements that contains the current state of computation in a Gorilla program.

Control State: A pointer to the current state in a state machine, stage in a pipeline, or instruction in a program associated to an engine.

Dataflow token: Components input/output data elements.

Kernel operation: An atomic unit of computation in a kernel. There might not be a one to one mapping between kernel operations and the corresponding realizations as states in a state machine, stages in a pipeline, or instructions running on a general purpose instruction-based processor.

Accelerators can be used for many big data systems that are built from a pipeline of subsystems including data collection and logging layers, a Messaging layer, a Data ingestion layer, a Data enrichment layer, a Data store layer, and an Intelligent extraction layer. Usually data collection and logging layer are done on many distributed nodes. Messaging layers are also distributed. However, ingestion, enrichment, storing, and intelligent extraction happen at the central or semi-central systems. In many cases, ingestions and enrichments need a significant amount of data processing. However, large quantities of data need to be transferred from event producers, distributed data collection and logging layers and messaging layers to the central systems for data processing.

Examples of data collection and logging layers are web servers that are recording website visits by a plurality of users. Other examples include sensors that record a measurement (e.g., temperature, pressure) or security devices that record special packet transfer events. Examples of a messaging layer include a simple copying of the logs, or using more sophisticated messaging systems (e.g., Kafka, Nifi). Examples of ingestion layers include extract, transform, load (ETL) tools that refer to a process in a database usage and particularly in data warehousing. These ETL tools extract data from data sources, transform the data for storing in a proper format or structure for the purposes of querying and analysis, and load the data into a final target (e.g., database, data store, data warehouse). An example of a data enrichment layer is adding geographical information or user data through databases or key value stores. A data store layer can be a simple file system or a database. An intelligent extraction layer usually uses machine learning algorithms to learn from past behavior to predict future behavior.

FIG. 1 shows an embodiment of a block diagram of a big data system 100 for providing big data applications for a plurality of devices in accordance with one embodiment. The big data system 100 includes machine learning modules 130, ingestion layer 132, enrichment layer 134, microservices 136 (e.g., microservice architecture), reactive services 138, and business intelligence layer 150. In one example, a microservice architecture is a method of developing software applications as a suite of independently deployable, small, modular services. Each service has a unique process and communicates through a lightweight mechanism. The system 100 provides big data services by collecting data from messaging systems 182 and edge devices, messaging systems 184, web servers 195, communication modules 102, internet of things (IoT) devices 186, and devices 104 and 106 (e.g., source device, client device, mobile phone, tablet device, lap top, computer, connected or hybrid television (TV), IPTV, Internet TV, Web TV, smart TV, satellite device, satellite TV, automobile, airplane, etc.). Each device may include a respective big data application 105, 107 (e.g., a data collecting software layer) for collecting any type of data that is associated with the device (e.g., user data, device type, network connection, display orientation, volume setting, language preference, location, web browsing data, transaction type, purchase data, etc.). The system 100, messaging systems and edge devices 182, messaging systems 184, web servers 195, communication modules 102, internet of things (IoT) devices 186, and devices 104 and 106 communicate via a network 180 (e.g., Internet, wide area network, cellular, WiFi, WiMax, satellite, etc.).

With the help of domain specific languages/libraries (DSLs), big data platforms can leverage the domain information to generate efficient code for execution, such as Spark SQL and DataFrame for data analytics, Tensorflow for Machine learning, etc. However, applications often need user-defined code on top of the DSL framework to provide more functional flexibility. User-defined functions (UDF) usually use arbitrary code written in general programming languages, which is unfortunately a black-box for big data platforms to optimize due to lack of any domain information.

Figure 2:
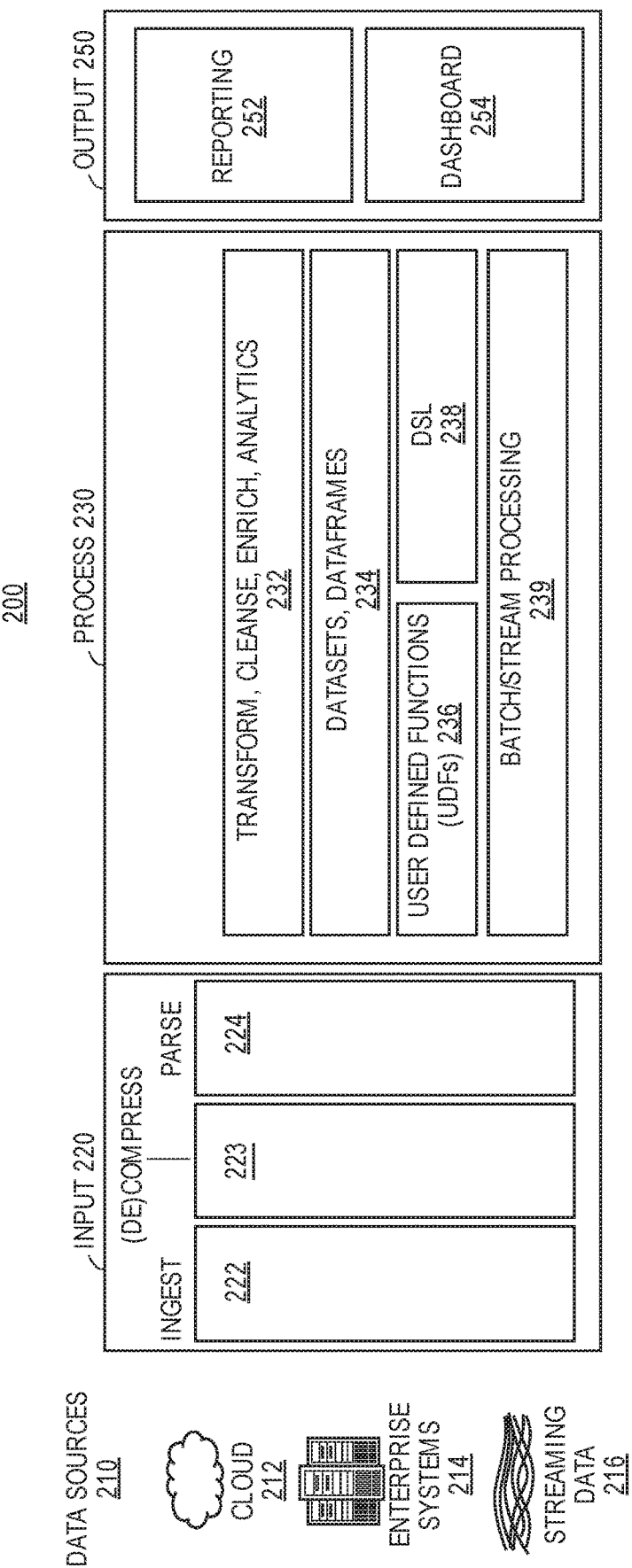
FIG. 2 shows a block diagram of a platform 200 for accelerating big data applications in accordance with one embodiment.

FIG. 2 shows a block diagram of a platform 200 for accelerating big data applications in accordance with one embodiment. The processing system 200 receives data from data sources 210 including cloud 212, enterprises systems 214, and streaming data 216. An input system receives data and performs ingest 222, decompress or compress 223, and parse 224 operations. The platform includes a processing system 230 to process the input data. The processing may include a transform, cleanse, enrich, and analytics layer 232, datasets and data frames layer 234, user defined functions 236, DSL 238 (e.g., SQL), and batch/stream processing layer 239. The processing system 230 outputs processed data to output system 250 for reporting 252 and dashboard 254 features of the output system 250.

User-defined functions (code) need to be executed as part of the application. Existing systems use one of the following approaches. A first approach includes UDFs being written in the same language as the big data application, such as Scala, Java, and Python. Big data systems run UDFs as is without optimization, i.e. Spark dataset UDFs. A second approach includes UDFs being written in the same language as the big data application. The system run the UDFs as is, but provide optimizations for serializing and deserializing input/output data around UDFs, i.e. Pandas vectorized python UDFs, Hive Java UDFs, etc. This second approach provides better data throughput but UDF bodies still remain unoptimized.

A third approach requires UDFs to be written in more efficient native languages, such as C++, so as to be plugged into the system whose underlying implementation is written in the same language, i.e. Hive C++ UDFs (though the system interfaces are in managed languages hence the applications are in managed languages as well). This approach can provide better overall efficiency for UDF execution, but UDFs need to be written in different languages from the application which reduces productivity and programmability.

The present design utilizes native code (e.g., C, C++) that usually runs faster than managed code since the native code is free from managed memory overhead (i.e., no garbage collection, no reference counting, no automatic memory release) and has simpler data layout for objects with less memory consumption. The present design provides an acceleration mechanism for user-defined functions used in streaming dataflow applications. The present design automatically translates UDFs from managed languages into native code for efficient execution. The automatic translation helps to hide the optimization from application designers to achieve high performance while keeping the programmability.

Compiling a program written in managed languages into code in native languages requires support for memory management in native space. For streaming data flow based big data applications, the memory allocation and accessing patterns are usually side effect free between different streaming iterations. Thus, this present design provides an ultra-lightweight native memory management mechanism based on an allocation scheme (e.g., slab allocation, bump pointer allocation). Slab allocation is a memory management mechanism intended for the efficient memory allocation of kernel objects. Slab allocation eliminates fragmentation caused by allocations and deallocations. The technique is used to retain allocated memory that contains a data object of a certain type for reuse upon subsequent allocations of objects of the same type. The present design can be easily integrated with the compiler to translate user-defined managed code into native code for high execution performance and more manageable memory consumption.

Figure 3:
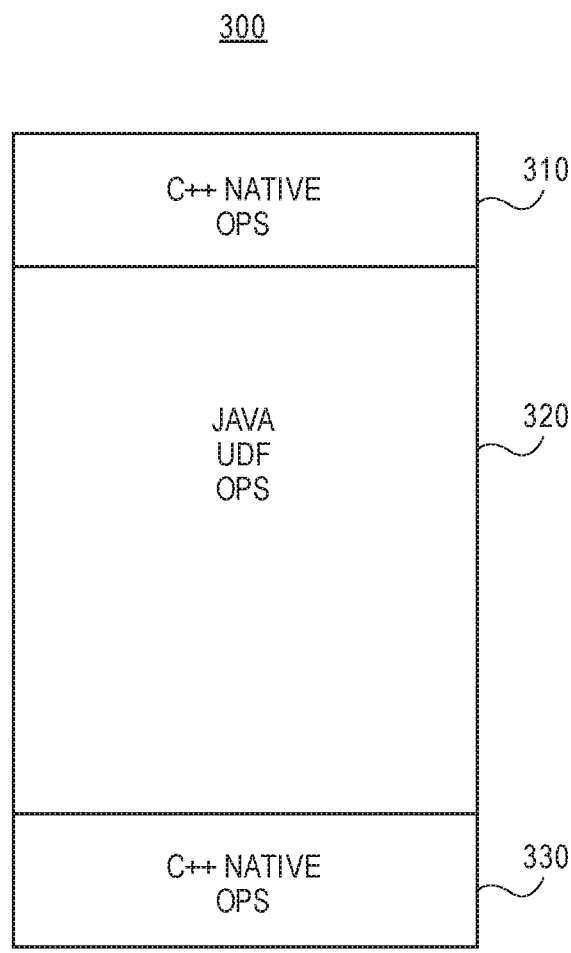
FIG. 3 illustrates software layers of a system with partial execution in native space and partial execution with UDF operations in accordance with one embodiment.

FIG. 3 illustrates software layers of a system with partial execution in native space and partial execution with UDF operations in accordance with one embodiment. The system 300 includes native operations 310 (e.g., C++ ops) for implementing SQL operations (e.g., filter.apply (row), project.apply (row)), UDF operations 320 (e.g., Java operations, Python operations), and native operations 330 for implementing SQL operations to generate output. The system has overhead from performing deserialization of byte based data of operations 310 into objects of UDFs (e.g., Java objects) so that UDFs can consume them and perform executions. Additional overhead is needed for serialization of objects into byte based data after UDFs are done and execution needs to go back to efficient DSL implementation. Managing object instances in native code requires support for memory management in native space as object release is not explicit in managed code.

Figure 4:
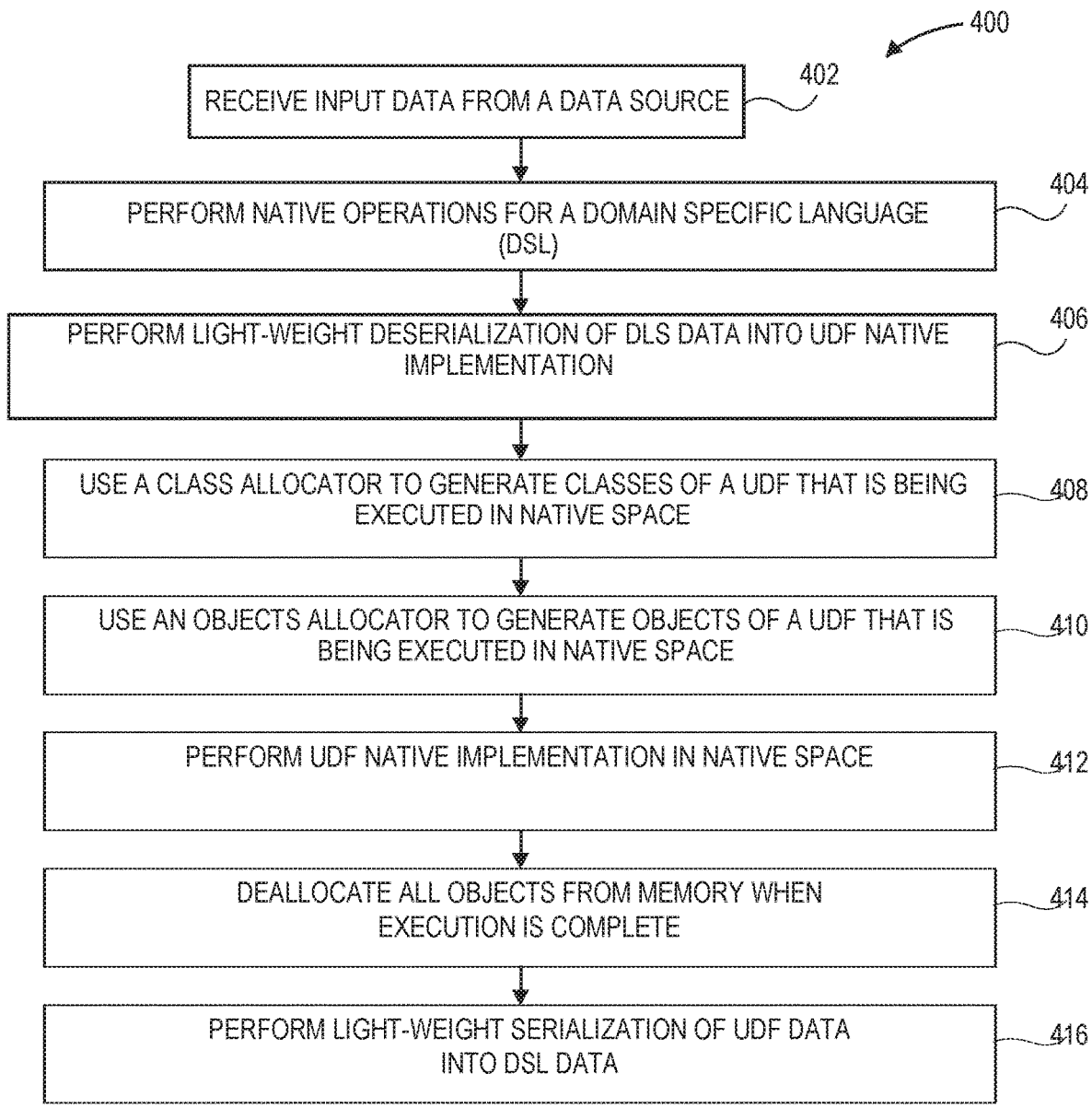
FIG. 4 is a flow diagram illustrating a method 400 for accelerating managed user-defined code for streaming big data applications in native space according to an embodiment of the disclosure.

FIG. 4 is a flow diagram illustrating a method 400 for accelerating managed user-defined code for different types of applications (e.g., streaming big data applications) in native space according to an embodiment of the disclosure. In one example, the big data applications are executed in native space to avoid overhead, such as transitions between native and UDFs (e.g., JVM), and also to provide a unified data layout. In another example, the applications can be executed on many-core architecture, GPUs, FPGAs, or accelerators.

Although the operations in the method 400 are shown in a particular order, the order of the actions can be modified. Thus, the illustrated embodiments can be performed in a different order, and some operations may be performed in parallel. Some of the operations listed in FIG. 4 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of method 400 may be executed by a compiler component or mechanism, a data processing system, a machine, a server, a web appliance, a centralized system, a distributed node, many-core architecture, GPU, FPGA, or an accelerator that may include hardware (circuitry, dedicated logic, etc.), software (such as is run on a general purpose computer system or a dedicated machine or a device), or a combination of both. In one embodiment, a compiler component performs the operations of method 400.

At operation 402, the method includes receiving input data from a data source. At operation 404, the method performs native operations (e.g., C++ operations) for a domain specific language (e.g., Spark SQL and DataFrame for data analytics, Tensorflow for Machine learning, etc.). In one example, native operations perform SQL operators. Dataflow-based streaming applications repeatedly perform the same computation on input data tokens over different iterations. Memory used for one iteration can be completely cleared for the next iteration as the compute does not have side-effects across iterations. In one example, a bump allocator is a natural fit for this type of compute while allocation keeps going within an iteration, the memory will be reclaimed entirely and reused for the next iteration (keep allocating and release only once). Only one allocator is needed for streaming operations and another allocator for allocating application static objects.

DSL can usually be efficiently implemented by directly mapping the domain functionality into efficient implementation code. For example, Spark DataFrame internals uses wholestage CodeGen to inline SQL operators so as to reduce memory accesses between operators. Physical data layout, such as Spark Tungsten, organize data in off-heap memory to eliminate the overhead of JVM object model and garbage collection for conventional UDF implementation.

While these optimizations are performed on the DSL part of the application, to execute UDFs that are usually part of DSL operators (such as a UDF predicate in a filter), physical data needs to be deserialized into VM objects so that UDFs can consume them and perform executions. The reverse process, i.e. serialize from VM objects to physical memory data layout is needed after UDF is done and execution needs to go back to efficient DSL implementation. The transformation of data layouts carried by deserialization and serialization are usually costly due to involving large amount of memory for big data applications.

Running UDFs in native code can reduce the cost of data deserialization/serialization since the data can be kept in physical (off-heap) memory for both DSL implementation and UDFs to access. Although light-weight deserialization/serialization is still needed to convert data into different representations between DSL implementation and UDF native implementation, the underlying memory space can generally be shared with the transformation that is mainly performed to wrap them in different constructs for different access patterns. The copy-free nature of the deserialize/serialize process lead to more memory efficiency.

At operation 406, the method performs light-weight deserialization of DSL data into UDF native implementation. At operation 408, the method uses a class allocator to generate classes of a UDF that is being executed in native space. At operation 410, the method uses an object allocator to generate objects of a UDF that is being executed in native space. Objects (references) in managed code are directly translated into C or C++ instances (pointers).

At operation 412, the method performs the UDF native implementation in native space (e.g., C++). At operation 414, the object allocator deallocates all objects from memory when execution is complete. Release all objects at same time when finished, so low reallocation cost (i.e., low garbage collection cost).

At operation 416, the method performs light-weight serialization of UDF data into DSL data. This method is able to maintain memory semantics of the UDF in C/C++ with memory management.

Figure 5:
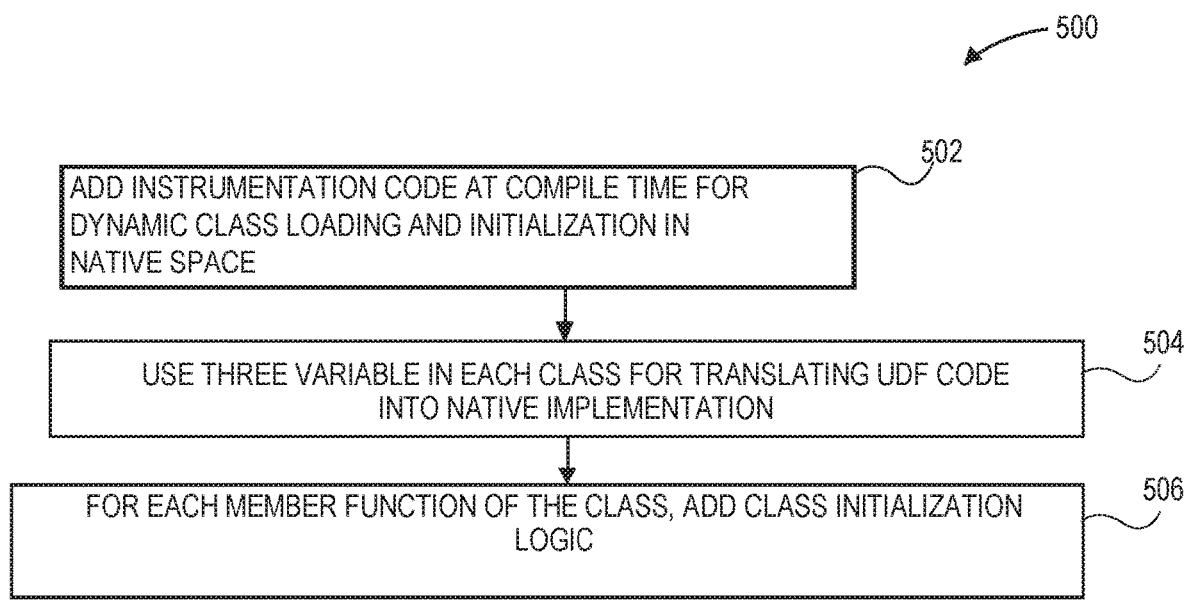
FIG. 5 is a flow diagram illustrating a method 500 for a thread-safe class loading and initialization mechanism in native language for UDF translation according to an embodiment of the disclosure.

FIG. 5 is a flow diagram illustrating a method 500 for a thread-safe class loading and initialization mechanism in native language for UDF translation according to an embodiment of the disclosure. Although the operations in the method 500 are shown in a particular order, the order of the actions can be modified. Thus, the illustrated embodiments can be performed in a different order, and some operations may be performed in parallel. Some of the operations listed in FIG. 5 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of method 500 may be executed by a compiler component or mechanism, a data processing system, a machine, a server, a web appliance, a centralized system, a distributed node, many-core architecture, GPU, FPGA, or an accelerator that may include hardware (circuitry, dedicated logic, etc.), software (such as is run on a general purpose computer system or a dedicated machine or a device), or a combination of both. In one embodiment, a compiler component performs the operations of method 500. In one example, method 500 is a detailed explanation of operation 408.

In addition to runtime optimization, managed languages often rely on virtual machine or interpreters to handle things dynamically at runtime, such as class loading, static member variable initialization, etc.

Compilation from managed language into native language is performed statically before execution. Therefore, native mechanisms need to be provided to handle steps that would otherwise be taken care of by the VM at run time for managed languages. The following algorithm describes a thread-safe class loading and initialization mechanism in native language for UDF translation.

At operation 502, instrumentation code is added at compile time for dynamic class loading and initialization in native space (e.g., C, sSC++). At operation 504, the method includes using three variables in each class (the following description is based on translating Java UDF code into C++ native implementation) with the first variable being a boolean value to indicate whether a class has been initialized or not, i.e. bool_axbd_clinit_begin. A second variable is an atomic boolean value to indicate whether the class initialization process has finished or not, i.e. std::atomic<bool>_axbd_clinit_end and a third variable is a mutex lock to make the initialization process a mutual exclusive monitor (only exclusive access for unique class, just 1 instance), i.e. std::recursive_mutex_axbd_clinit_mutex.

For each member function of the class (static or non-static) except <clinit> (the class initialization function), at operation 506, add the following class initialization logic at the beginning of the function:

if (_axbd_clinit_end.load( ) == false)
    clinit(_axbd_alloc); this happens every time a function is called to gurantee that the class has been initialized before any member function being executed.

```
For <clinit> function, the new generated code looks like the following:
void clinit(...) {
// create clinit monitor
std::lock_guard<std::recursive_mutex> _axbd_clinit_lock(_axbd_clinit_mutext);
// if clinit has already started, bail out; this is when static circular init happens.
if (_axbd_clinit_begin) return;
_axbd_clinit_begin = true;
// run the original <clinit> code; wrapped function used to handle multiple-exit cases
   // the bump pointer allocator is passed a function argument for efficient memory
allocation.
   clinit_original_wrapper(_axbd_alloc);
   _axbd_clinit_end.store(true);
// since still in the monitor, relaxed memory model is sufficient to use here.
   }
```

A bump point allocator is a known allocator with a pointer bumped to next object to next memory space. The algorithm above guarantees that initialization only happens once for each class in a thread-safe way. To use the same mechanism to guarantee that the class is initialized before any member variables being accessed can be achieved by wrapping variable accesses into function calls.

Figure 6:
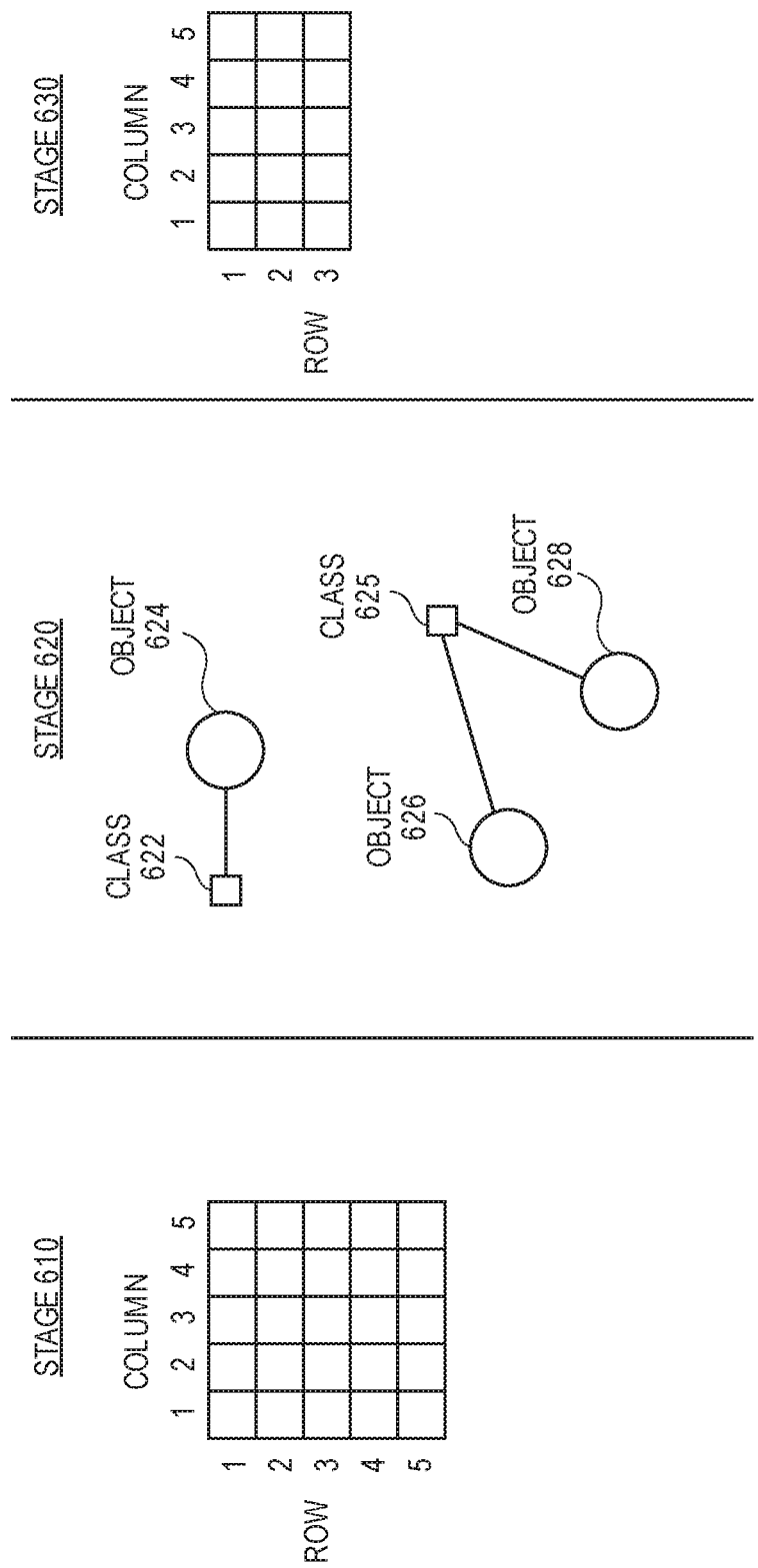
FIG. 6 illustrates different stages of a Big Data application in accordance with one embodiment.

FIG. 6 illustrates different stages of a Big Data application in accordance with one embodiment. A first stage 610 receives input data from a data source. The DSL data can be byte based data organized in rows and columns of a database. The DSL data can be deserialized into UDF data for stage 620. In one example, a user filter query for UDF is locating data from different rows of the database, comparing the located data, and then generating an output based on the comparison.

Operations 408, 410, and 412 can be performed for executing the UDF implementation with classes 622, 625 and objects 624, 626, 628 in native space (e.g., C++). Operation 416 is performed for light-weight serialization of UDF data into DSL data that is organized in rows and columns of a database of stage 630.

Figure 7:
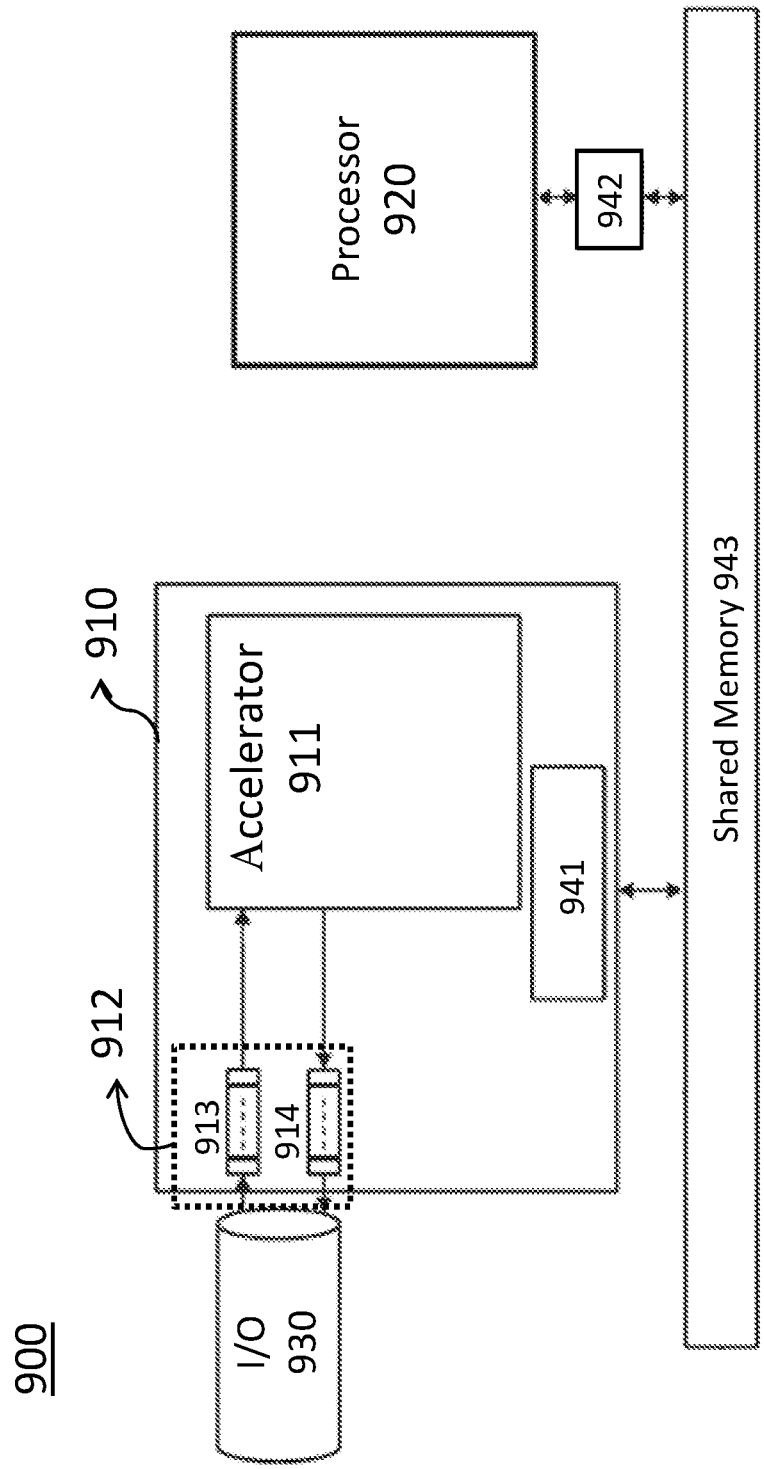
FIG. 7 illustrates the schematic diagram of a data processing system according to an embodiment of the present invention.

FIG. 7 illustrates the schematic diagram of data processing system 900 that utilizes an ultra-lightweight native memory management mechanism according to an embodiment of the present invention. Data processing system 900 includes I/O processing unit 910 and general purpose instruction-based processor 920. In an embodiment, general purpose instruction-based processor 920 may include a general purpose core or multiple general purpose cores. A general purpose core is not tied to or integrated with any particular algorithm. In an alternative embodiment, general purpose instruction-based processor 920 may be a specialized core. I/O processing unit 910 may include an accelerator 911 (e.g., in-line accelerator, offload accelerator for offloading processing from another computing resource, or both). In-line accelerators are a special class of accelerators that may be used for I/O intensive applications. Accelerator 911 and general purpose instruction-based processor may or may not be on a same chip. Accelerator 911 is coupled to I/O interface 912. Considering the type of input interface or input data, in one embodiment, the accelerator 911 may receive any type of network packets from a network 930 and an input network interface card (NIC). In another embodiment, the accelerator maybe receiving raw images or videos from the input cameras. In an embodiment, accelerator 911 may also receive voice data from an input voice sensor device.

In an embodiment, accelerator 911 is coupled to multiple I/O interfaces (not shown in the figure). In an embodiment, input data elements are received by I/O interface 912 and the corresponding output data elements generated as the result of the system computation are sent out by I/O interface 912. In an embodiment, I/O data elements are directly passed to/from accelerator 911. In processing the input data elements, in an embodiment, accelerator 911 may be required to transfer the control to general purpose instruction-based processor 920. In an alternative embodiment, accelerator 911 completes execution without transferring the control to general purpose instruction-based processor 920. In an embodiment, accelerator 911 has a master role and general purpose instruction-based processor 920 has a slave role.

In an embodiment, accelerator 911 partially performs the computation associated with the input data elements and transfers the control to other accelerators or the main general purpose instruction-based processor in the system to complete the processing. The term "computation" as used herein may refer to any computer task processing including, but not limited to, any of arithmetic/logic operations, memory operations, I/O operations, and offloading part of the computation to other elements of the system such as general purpose instruction-based processors and accelerators. Accelerator 911 may transfer the control to general purpose instruction-based processor 920 to complete the computation. In an alternative embodiment, accelerator 911 performs the computation completely and passes the output data elements to I/O interface 912. In another embodiment, accelerator 911 does not perform any computation on the input data elements and only passes the data to general purpose instruction-based processor 920 for computation. In another embodiment, general purpose instruction-based processor 920 may have accelerator 911 to take control and completes the computation before sending the output data elements to the I/O interface 912.

In an embodiment, accelerator 911 may be implemented using any device known to be used as accelerator, including but not limited to field-programmable gate array (FPGA), Coarse-Grained Reconfigurable Architecture (CGRA), general-purpose computing on graphics processing unit (GPGPU), many light-weight cores (MLWC), network general purpose instruction-based processor, I/O general purpose instruction-based processor, and application-specific integrated circuit (ASIC). In an embodiment, I/O interface 912 may provide connectivity to other interfaces that may be used in networks, storages, cameras, or other user interface devices. I/O interface 912 may include receive first in first out (FIFO) storage 913 and transmit FIFO storage 914. FIFO storages 913 and 914 may be implemented using SRAM, flip-flops, latches or any other suitable form of storage. The input packets are fed to the accelerator through receive FIFO storage 913 and the generated packets are sent over the network by the accelerator and/or general purpose instruction-based processor through transmit FIFO storage 914.

In an embodiment, I/O processing unit 910 may be Network Interface Card (NIC). In an embodiment of the invention, accelerator 911 is part of the NIC. In an embodiment, the NIC is on the same chip as general purpose instruction-based processor 920. In an alternative embodiment, the NIC 910 is on a separate chip coupled to general purpose instruction-based processor 920. In an embodiment, the NIC-based accelerator receives an incoming packet, as input data elements through I/O interface 912, processes the packet and generates the response packet(s) without involving general purpose instruction-based processor 920. Only when accelerator 911 cannot handle the input packet by itself, the packet is transferred to general purpose instruction-based processor 920. In an embodiment, accelerator 911 communicates with other I/O interfaces, for example, storage elements through direct memory access (DMA) to retrieve data without involving general purpose instruction-based processor 920.

Accelerator 911 and the general purpose instruction-based processor 920 are coupled to shared memory 943 through private cache memories 941 and 942 respectively. In an embodiment, shared memory 943 is a coherent memory system. The coherent memory system may be implemented as shared cache. In an embodiment, the coherent memory system is implemented using multiples caches with coherency protocol in front of a higher capacity memory such as a DRAM.

In an embodiment, the transfer of data between different layers of accelerations may be done through dedicated channels directly between accelerator 911 and processor 920. In an embodiment, when the execution exits the last acceleration layer by accelerator 911, the control will be transferred to the general-purpose core 920.

Processing data by forming two paths of computations on accelerators and general purpose instruction-based processors (or multiple paths of computation when there are multiple acceleration layers) have many other applications apart from low-level network applications. For example, most emerging big-data applications in data centers have been moving toward scale-out architectures, a technology for scaling the processing power, memory capacity and bandwidth, as well as persistent storage capacity and bandwidth. These scale-out architectures are highly network-intensive. Therefore, they can benefit from acceleration. These applications, however, have a dynamic nature requiring frequent changes and modifications. Therefore, it is highly beneficial to automate the process of splitting an application into a fast-path that can be executed by an accelerator with subgraph templates and a slow-path that can be executed by a general purpose instruction-based processor as disclosed herein.

While embodiments of the invention are shown as two accelerated and general-purpose layers throughout this document, it is appreciated by one skilled in the art that the invention can be implemented to include multiple layers of computation with different levels of acceleration and generality. For example, a FPGA accelerator can backed by a many-core hardware. In an embodiment, the many-core hardware can be backed by a general purpose instruction-based processor.

Figure 8:
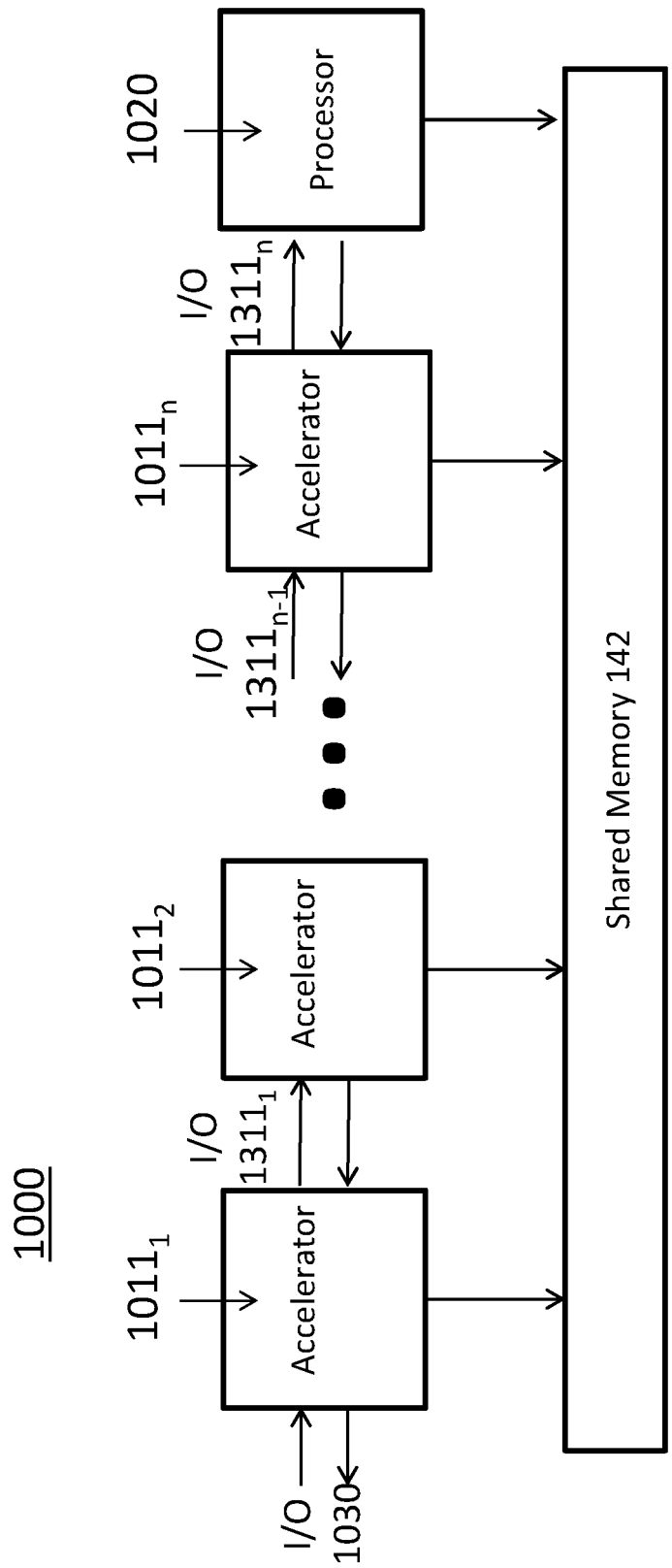
FIG. 8 illustrates the schematic diagram of a multi-layer accelerator according to an embodiment of the invention.

Referring to FIG. 8, in an embodiment of invention, a multi-layer system 1000 that utilizes an ultra-lightweight native memory management mechanism is formed by a first accelerator $1011_1$ (e.g., in-line accelerator, offload accelerator for offloading processing from another computing resource, or both) and several other accelerators $1011_n$ (e.g., in-line accelerator, offload accelerator for offloading processing from another computing resource, or both). The multi-layer system 1000 includes several accelerators, each performing a particular level of acceleration. In such a system, execution may begin at a first layer by the first accelerator $1011_1$. Then, each subsequent layer of acceleration is invoked when the execution exits the layer before it. For example, if the accelerator $1011_1$ cannot finish the processing of the input data, the input data and the execution will be transferred to the next acceleration layer, accelerator $1011_2$. In an embodiment, the transfer of data between different layers of accelerations may be done through dedicated channels between layers (e.g., $1311_1$ to $1311_n$). In an embodiment, when the execution exits the last acceleration layer by accelerator $1011_n$, the control will be transferred to the general-purpose core 1020.

Figure 9:
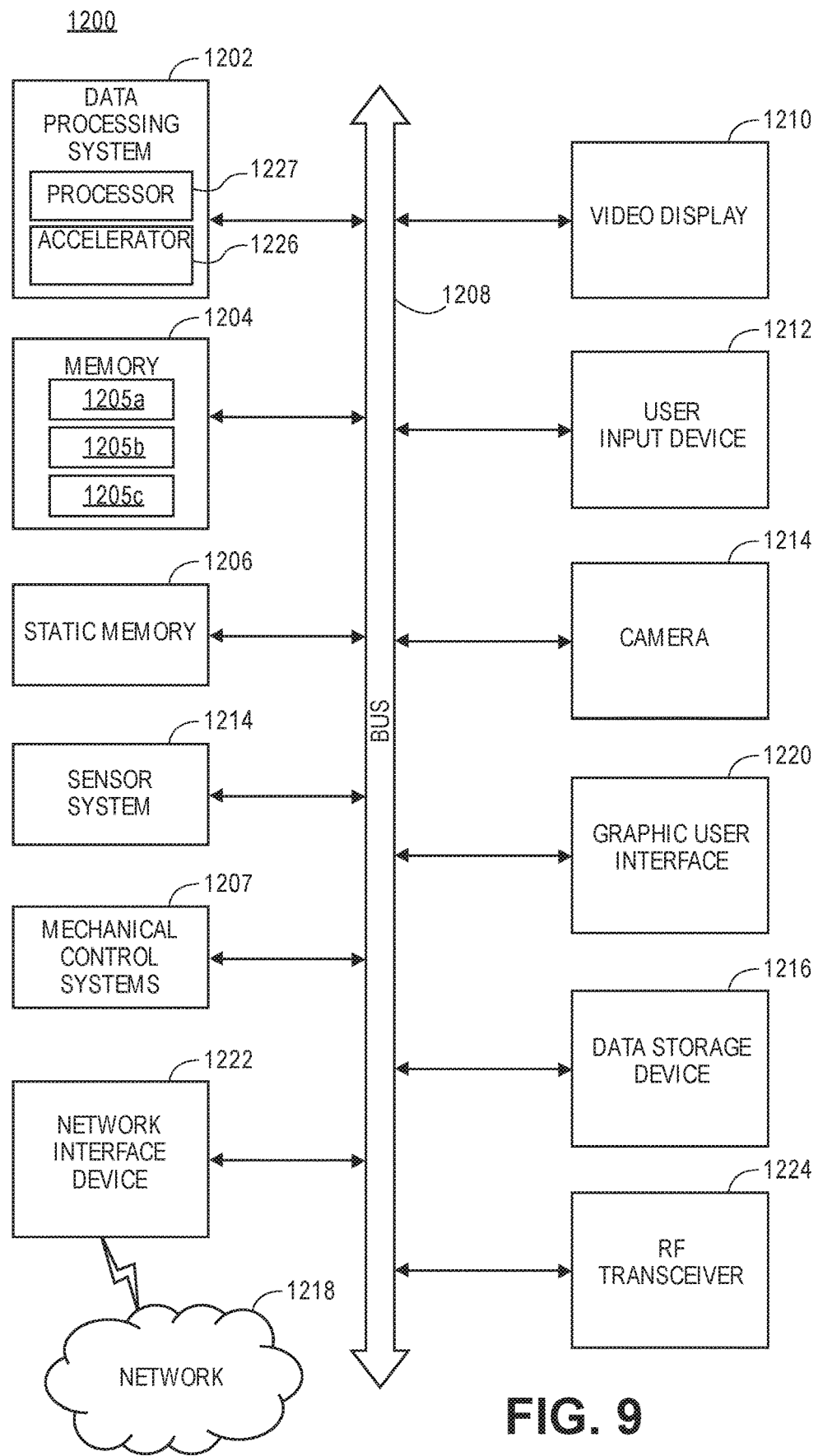
FIG. 9 is a diagram of a computer system including a data processing system according to an embodiment of the invention.

FIG. 9 is a diagram of a computer system including a data processing system that utilizes an ultra-lightweight native memory management mechanism according to an embodiment of the invention. Within the computer system 1200 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client in a client-server network environment, or as a peer machine in a peer-to-peer (or distributed) network environment, the machine can also operate in the capacity of a web appliance, a server, a network router, switch or bridge, event producer, distributed node, centralized system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

Data processing system 1202, as disclosed above, includes a general purpose instruction-based processor 1227 and an accelerator 1226 (e.g., in-line accelerator, offload accelerator for offloading processing from another computing resource, or both). The general purpose instruction-based processor may be one or more general purpose instruction-based processors or processing devices (e.g., microprocessor, central processing unit, or the like). More particularly, data processing system 1202 may be a complex instruction set computing (CISC) microprocessor, reduced instruction set computing (RISC) microprocessor, very long instruction word (VLIW) microprocessor, general purpose instruction-based processor implementing other instruction sets, or general purpose instruction-based processors implementing a combination of instruction sets. The accelerator may be one or more special-purpose processing devices such as an application specific integrated circuit (ASIC), a field programmable gate array (FPGA), a digital signal general purpose instruction-based processor (DSP), network general purpose instruction-based processor, many light-weight cores (MLWC) or the like. Data processing system 1202 is configured to implement the data processing system for performing the operations and steps discussed herein.

The exemplary computer system 1200 includes a data processing system 1202, a main memory 1204 (e.g., read-only memory (ROM), flash memory, dynamic random access memory (DRAM) such as synchronous DRAM (SDRAM) or DRAM (RDRAM), etc.), a static memory 1206 (e.g., flash memory, static random access memory (SRAM), etc.), and a data storage device 1216 (e.g., a secondary memory unit in the form of a drive unit, which may include fixed or removable computer-readable storage medium), which communicate with each other via a bus 1208. The storage units disclosed in computer system 1200 may be configured to implement the data storing mechanisms for performing the operations and steps discussed herein. Memory 1206 can store code and/or data for use by processor 1227 or accelerator 1226. Memory 1206 include a memory hierarchy that can be implemented using any combination of RAM (e.g., SRAM, DRAM, DDRAM), ROM, FLASH, magnetic and/or optical storage devices. Memory may also include a transmission medium for carrying information-bearing signals indicative of computer instructions or data (with or without a carrier wave upon which the signals are modulated).

Processor 1227 and accelerator 1226 execute various software components stored in memory 1204 to perform various functions for system 1200. In one embodiment, the software components include operating system 1205a, compiler component 1205b for utilizing an ultra-lightweight native memory management mechanism, and communication module (or set of instructions) 1205c. Furthermore, memory 1206 may store additional modules and data structures not described above.

Operating system 1205a includes various procedures, sets of instructions, software components and/or drivers for controlling and managing general system tasks and facilitates communication between various hardware and software components. A compiler is a computer program (or set of programs) that transform source code written in a programming language into another computer language (e.g., target language, object code). A communication module 1205c provides communication with other devices utilizing the network interface device 1222 or RF transceiver 1224.

The computer system 1200 may further include a network interface device 1222. In an alternative embodiment, the data processing system disclose is integrated into the network interface device 1222 as disclosed herein. The computer system 1200 also may include a video display unit 1210 (e.g., a liquid crystal display (LCD), LED, or a cathode ray tube (CRT)) connected to the computer system through a graphics port and graphics chipset, an input device 1212 (e.g., a keyboard, a mouse), a camera 1214, and a Graphic User Interface (GUI) device 1220 (e.g., a touch-screen with input & output functionality).

The computer system 1200 may further include a RF transceiver 1224 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/de-interleaving, spreading/dispreading, inverse fast Fourier transforming (IFFT)/fast Fourier transforming (FFT), cyclic prefix appending/removal, and other signal processing functions.

The Data Storage Device 1216 may include a machine-readable storage medium (or more specifically a computer-readable storage medium) on which is stored one or more sets of instructions embodying any one or more of the methodologies or functions described herein. Disclosed data storing mechanism may be implemented, completely or at least partially, within the main memory 1204 and/or within the data processing system 1202 by the computer system 1200, the main memory 1204 and the data processing system 1202 also constituting machine-readable storage media.

In one example, the computer system 1200 is an autonomous vehicle that may be connected (e.g., networked) to other machines or other autonomous vehicles in a LAN, WAN, or any network. The autonomous vehicle can be a distributed system that includes many computers networked within the vehicle. The autonomous vehicle can transmit communications (e.g., across the Internet, any wireless communication) to indicate current conditions (e.g., an alarm collision condition indicates close proximity to another vehicle or object, a collision condition indicates that a collision has occurred with another vehicle or object, etc.). The autonomous vehicle can operate in the capacity of a server or a client in a client-server network environment, or as a peer machine in a peer-to-peer (or distributed) network environment. The storage units disclosed in computer system 1200 may be configured to implement data storing mechanisms for performing the operations of autonomous vehicles.

The computer system 1200 also includes sensor system 1214 and mechanical control systems 1207 (e.g., motors, driving wheel control, brake control, throttle control, etc.). The processing system 1202 executes software instructions to perform different features and functionality (e.g., driving decisions) and provide a graphical user interface 1220 for an occupant of the vehicle. The processing system 1202 performs the different features and functionality for autonomous operation of the vehicle based at least partially on receiving input from the sensor system 1214 that includes laser sensors, cameras, radar, GPS, and additional sensors. The processing system 1202 may be an electronic control unit for the vehicle.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The invention claimed is:

1. A data processing system comprising:
   memory;
   a processing unit coupled to the memory, the processing unit is configured to receive input data, to execute a domain specific language (DSL) for a DSL operation with a native implementation, to translate a user defined function (UDF) into the native implementation by translating user defined managed software code into native software code, to execute the native software code in the native implementation, and to utilize a native memory management mechanism for the memory to manage object instances in the native implementation, wherein the native memory management mechanism comprises a bump allocator to continue allocation within an iteration, wherein the memory will be reclaimed entirely and reused for a next iteration.

2. The data processing system of claim 1, wherein the DSL operation comprises a SQL operation and the UDF function comprises a Java function.

3. The data processing system of claim 1, wherein the native memory management mechanism to release all object instances simultaneously when the native implementation completes execution of the UDF data.

4. The data processing system of claim 1, wherein the native memory management mechanism comprises a first allocator for streaming operations.

5. The data processing system of claim 4, wherein the native memory management mechanism comprises a second allocator for allocating application static objects.

6. A computer-implemented method for efficient memory management in native code, comprising:
   receiving, with a processing unit, input data from a data source;
   performing, with the processing unit, native operations for a domain specific language (DSL) by directly map the domain functionality into efficient implementation code;
   performing light-weight deserialization of DSL data into UDF native implementation; and
   performing the UDF native implementation in native space.

7. The computer-implemented method of claim 6, wherein performing the UDF native implementation in native space reduces a cost of data deserialization and serialization since the data is kept in physical off-heap memory for both DSL implementation and UDF implementation.

8. The computer-implemented method of claim 6, wherein a copy-free nature of the data deserialization and serialization leads to more memory efficiency.

9. The computer-implemented method of claim 6, further comprising:
   using a class allocator to generate classes of the UDF that is being executed in native space.

10. The computer-implemented method of claim 9, further comprising:
    using an object allocator to generate objects of the UDF that is being executed in native space.

11. A computer-implemented method, comprising:
    receiving, with a data processing system, input data from a data source;
    performing, with the data processing system, native operations for a domain specific language; and
        performing a thread-safe class loading and initialization mechanism in native software code for user defined function (UDF) translation.

12. The computer-implemented method of claim 11, wherein performing the thread-safe class loading and initialization mechanism comprises:
    adding instrumentation software code at compile time for dynamic class loading and initialization;
    utilizing three variables in each class including a first variable to indicate whether a class has been initialized.

13. The computer-implemented method of claim 12, wherein the three variables includes a second variable to indicate whether class initialization process has finished.

14. The computer-implemented method of claim 12, wherein the three variables includes a third variable that comprises a mutual exclusive lock to make initialization process a mutual exclusive monitor.

15. The computer-implemented method of claim 12, wherein the thread-safe class loading and initialization mechanism provides initialization only once for each class in a thread-safe manner.

16. A data processing system comprising:
    memory;
    a processing unit coupled to the memory, the processing unit is configured to receive input data from a data source, perform native operations for a domain specific language, and perform a thread-safe class loading and initialization mechanism in native software code for user defined function (UDF) translation.

17. The data processing system of claim 16, wherein performing the thread-safe class loading and initialization mechanism comprises:
    adding instrumentation software code at compile time for dynamic class loading and initialization;
    utilizing three variables in each class including a first variable to indicate whether a class has been initialized.

18. The data processing system of claim 17, wherein the three variables include a second variable to indicate whether class initialization process has finished.

19. The data processing system of claim 18, wherein the three variables include a third variable that comprises a mutual exclusive lock to make initialization process a mutual exclusive monitor.

20. The data processing system of claim 16, wherein the thread-safe class loading and initialization mechanism provides initialization only once for each class in a thread-safe manner.

21. The data processing system of claim 16, wherein the processing unit comprises a hardware accelerator, central processing unit, or a graphics processing unit.

* * * * *